(12) United States Patent
Suwa et al.

(10) Patent No.: US 9,639,683 B2
(45) Date of Patent: May 2, 2017

(54) INFORMATION PROCESSING DEVICE

(71) Applicant: Sony Computer Entertainment Inc., Tokyo (JP)

(72) Inventors: Yoshihiko Suwa, Kanagawa (JP); Akitsugu Tsuchiya, Kanagawa (JP); Yuji Nakamura, Tokyo (JP); Toru Ogiso, Tokyo (JP); Keigo Tamura, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 64 days.

(21) Appl. No.: 14/644,523

(22) Filed: Mar. 11, 2015

(65) Prior Publication Data

US 2015/0294098 A1    Oct. 15, 2015

(30) Foreign Application Priority Data

Apr. 10, 2014  (JP) .................................. 2014-081029

(51) Int. Cl.
*G06F 21/32*   (2013.01)

(52) U.S. Cl.
CPC .................................... *G06F 21/32* (2013.01)

(58) Field of Classification Search
CPC .................................. G06F 21/31; G06F 21/32
See application file for complete search history.

(56) References Cited

U.S. PATENT DOCUMENTS

| 6,111,517 A * | 8/2000 | Atick | G06F 21/32 340/5.83 |
| 6,751,734 B1 * | 6/2004 | Uchida | G06F 21/32 713/168 |
| 2004/0133857 A1 * | 7/2004 | Wu | G03G 15/502 715/201 |
| 2009/0258667 A1 * | 10/2009 | Suzuki | B66B 1/46 455/550.1 |
| 2012/0030754 A1 * | 2/2012 | Oowaki | G06F 21/31 726/19 |
| 2013/0208103 A1 * | 8/2013 | Sands | G06F 21/31 348/78 |

(Continued)

*Primary Examiner* — Saleh Najjar
*Assistant Examiner* — Khang Do
(74) *Attorney, Agent, or Firm* — Katten Muchin Rosenman LLP (57) ABSTRACT

An information processing device includes: an input receiving section receiving an input; a display control section changing a display screen to a first screen when the input receiving section has not received any input for a predetermined time; a registered user information retaining section retaining biological information of a plurality of users registered in the information processing device; a biological information obtaining portion obtaining biological information; and a biometric authenticating portion determining whether a user whose biological information is obtained by the biological information obtaining portion is a registered user by comparing the obtained biological information with the biological information of the plurality of users retained in the registered user information retaining section. When the biometric authenticating portion determines that the user whose biological information is obtained is a registered user, the display control section changes the first screen to a second screen.

5 Claims, 10 Drawing Sheets

(56) References Cited

U.S. PATENT DOCUMENTS

2015/0170104 A1\* 6/2015 Yamada ............. G06Q 10/1091
705/32
2016/0162683 A1\* 6/2016 Gibson ................... G06F 21/44
726/17

\* cited by examiner

| NOTIFICATION | |
|---|---|
| ☐ NEW ITEMS  [3] | ☐ MESSAGE HAS ARRIVED FROM RICHARD. |
| ☐ ALL ITEMS | ☐ INVITATION HAS ARRIVED FROM ANNA. |
| | ☐ INVITATION HAS ARRIVED FROM YAMADA. |

INFORMATION PROCESSING DEVICE

BACKGROUND

The present disclosure relates to a technology of changing a screen state.

A screen saver has a history of being used as a utility adapted to prevent the burn-in of a cathode-ray tube, and is started to display a screen saver screen when there has been no operating input from a user for a predetermined time. Recently, a function of a screen saver which function ends the operation of the screen saver on the basis of the input of a password has been utilized, and the screen saver may be automatically started and used to hide a display screen while the user is away from the desk. The display may display information not desired to be viewed by other people. It is therefore meaningful to make a setting for preventing another person from cancelling the screen saver by registering a password for the cancellation of the screen saver in advance.

SUMMARY

On the other hand, the secrecy of such information is not very much required in an information processing device such as a game device. Particularly when there is a possibility of a plurality of people using an information processing device, it is not necessary to register a password for the cancellation of the screen saver, and a setting for preventing the screen saver from being canceled unless the password is input rather impairs usability.

It is accordingly desirable to construct a mechanism in which the operation of a screen saver is easily ended when the screen saver has been started in an information processing device such as a game device. There have recently been cases where a utility that simply turns off a display power supply operates, instead of a screen saver being started, when a non-operation time has continued for a predetermined time. It is desirable to construct a mechanism in which a display screen is easily restored when a screen state has been changed by such a utility in a game device or the like.

Incidentally, such needs are not limited to game devices, but exist in other information processing devices to which a plurality of users can log in. It is desirable to control a screen state suitably also in such information processing devices.

It is accordingly desirable to provide a technology of suitably controlling a screen state.

According to an embodiment of the present disclosure, there is provided an information processing device including: an input receiving section receiving an input; a display control section changing a display screen to a first screen when the input receiving section has not received any input for a predetermined time; a registered user information retaining section retaining biological information of a plurality of users registered in the information processing device; a biological information obtaining portion obtaining biological information; and a biometric authenticating portion determining whether a user whose biological information is obtained by the biological information obtaining portion is a registered user by comparing the obtained biological information with the biological information of the plurality of users retained in the registered user information retaining section. When the biometric authenticating portion determines that the user whose biological information is obtained is a registered user, the display control section changes the first screen to a second screen.

It is to be noted that arbitrary combinations of the above constituent elements as well as modes realized by converting expressions of the present disclosure between a method, a device, a system, a recording medium, a computer program, and the like are also effective as embodiments of the present disclosure.

According to the information processing technology in accordance with the present disclosure, it is possible to provide a technology of suitably controlling a screen state.

DETAILED DESCRIPTION OF THE PREFERRED EMBODIMENT

Figure 1:
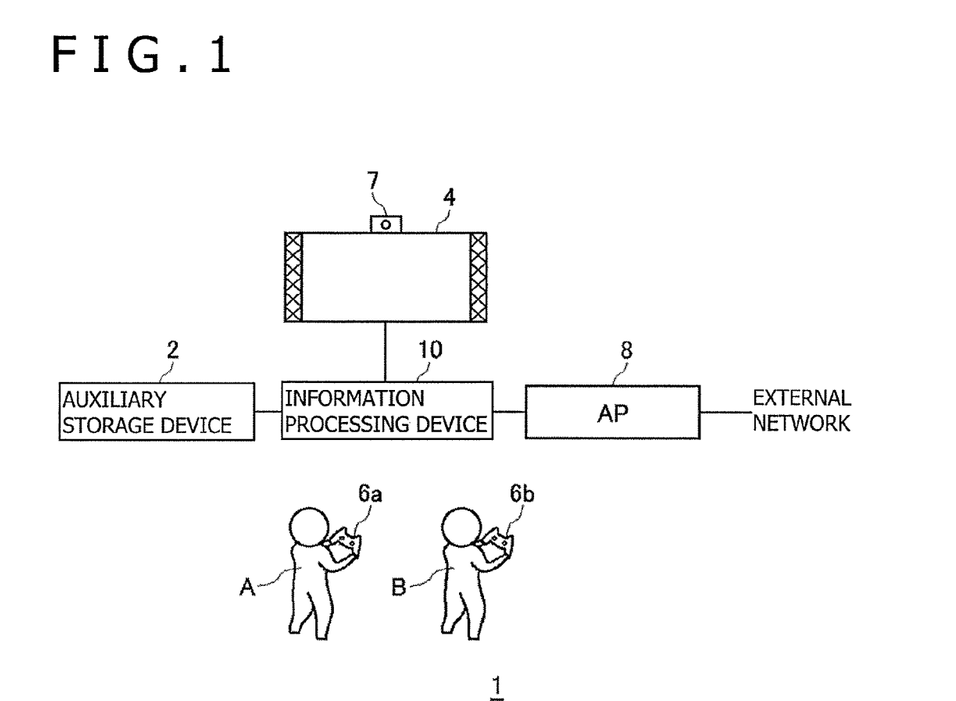
FIG. 1 is a diagram showing an information processing system according to an embodiment of the present disclosure.

FIG. 1 shows an information processing system 1 according to an embodiment of the present disclosure. The information processing system 1 includes an information processing device 10 as a user terminal and input devices 6a and 6b operated by users. The information processing device 10 may be connected to another information processing device or a server on an external network via an access point (AP) 8 so as to be able to communicate with the other information processing device or the server. A plurality of users can log in to the information processing device 10 simultaneously.

An auxiliary storage device 2 is a mass storage device such as an HDD (Hard Disk Drive) and a flash memory. The auxiliary storage device 2 may be an external storage device connected to the information processing device 10 by a USB (Universal Serial Bus) or the like, or may be an internal storage device. An output device 4 may be a television set including a display configured to output an image and a speaker configured to output sound. The information processing device 10 is connected to the input device 6 operated by the user by radio or by wire. The input device 6 outputs operation information indicating a result of operation by the user to the information processing device 10. When the information processing device 10 receives the operation information from the input device 6, the information processing device 10 reflects the operation information in the processing of an OS (system software) or an application, and makes a result of the processing be outputted from the output device 4.

A camera 7 as an imaging device is provided in the vicinity of the output device 4. The camera 7 images a space around the output device 4. FIG. 1 shows an example in which the camera 7 is attached to an upper portion of the output device 4. However, the camera 7 may be disposed on the side of the output device 4. In either case, the camera 7 is disposed in such a position as to be able to image the user playing a game in front of the output device 4. Incidentally, the camera 7 may be a stereo camera.

In the present embodiment, the information processing device 10 may be a game device that executes a game program, and the input device 6 may be a game controller that provides user operation information to the game device. The game controller includes a plurality of input portions such as a plurality of push type operating buttons, an analog stick allowing an analog quantity to be input, and a rotary button.

A button configuration of the input device 6 will be described.

[Constitution of Upper Surface Portion]

Figure 2A:
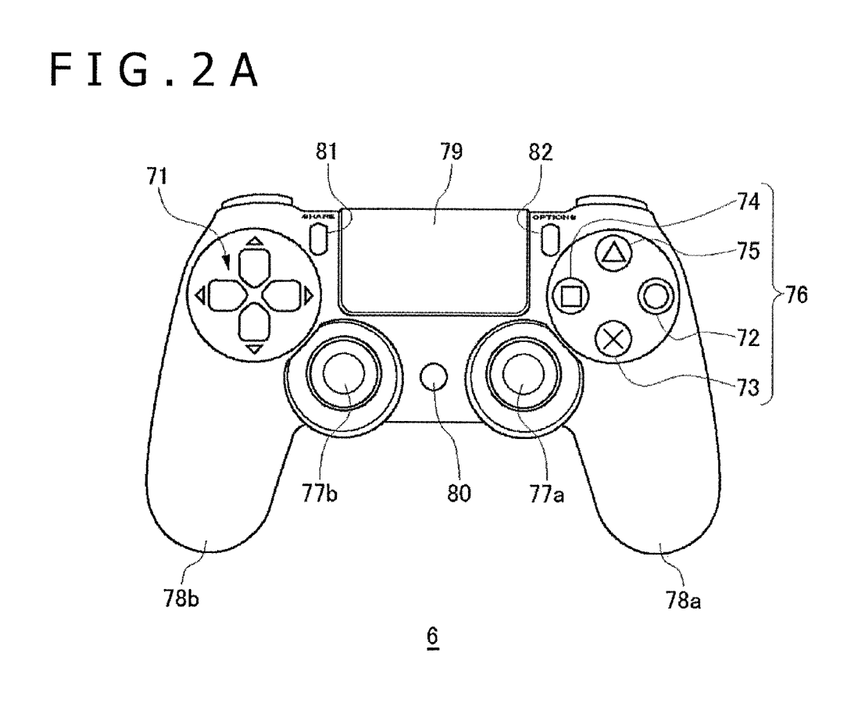
FIG. 2A is a diagram showing an external constitution of an upper surface of an input device.

FIG. 2A shows an external constitution of an upper surface of the input device 6. The user operates the input device 6 while holding a left grip portion 78b with a left hand and holding a right grip portion 78a with a right hand. The upper surface of a casing of the input device 6 is provided with a direction key 71, analog sticks 77a and 77b, and four kinds of operating buttons 76 as input portions. The four kinds of buttons 72 to 75 are marked with different figures of different colors so as to be distinguished from one another. Specifically, the circle button 72 is marked with a red circle, the cross button 73 is marked with a blue cross, the square button 74 is marked with a purple square, and the triangle button 75 is marked with a green triangle. A touch pad 79 is provided in a flat region between the direction key 71 and the operating buttons 76 on the upper surface of the casing. The touch pad 79 also functions as a depression type button that sinks downward when pressed by the user and which returns to an original position when released by the user.

A function button 80 is provided between the two analog sticks 77a and 77b. The function button 80 is used to turn on power to the input device 6 and simultaneously activate a communication function that connects the input device 6 and the information processing device 10 to each other. After the input device 6 is connected to the information processing device 10, the function button 80 is also used to display a menu screen on the information processing device 10.

A SHARE button 81 is provided between the touch pad 79 and the direction key 71. The SHARE button 81 is used to input an instruction from the user to the OS or the system software in the information processing device 10. In addition, an OPTIONS button 82 is provided between the touch pad 79 and the operating buttons 76. The OPTIONS button 82 is used to input an instruction from the user to an application (game) executed in the information processing device 10. The SHARE button 81 and the OPTIONS button 82 may each be formed as a push type button.

[Constitution of Side Surface Portion on Back Side]

Figure 2B:
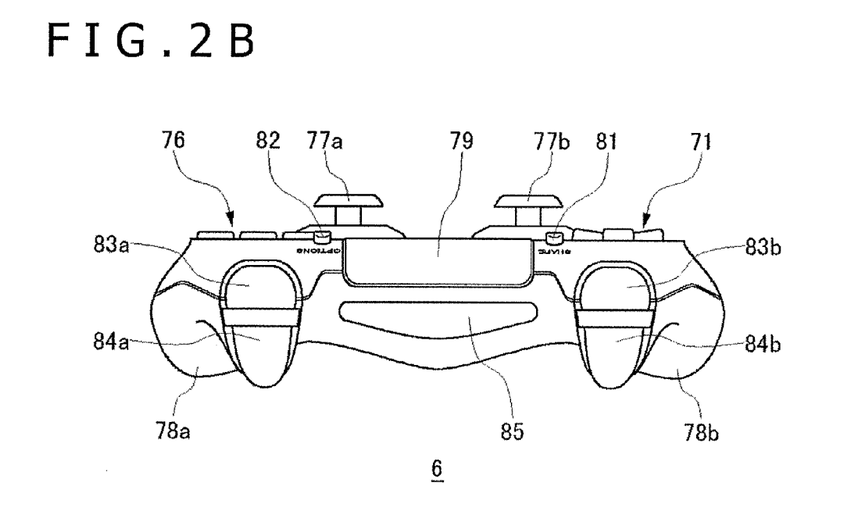
FIG. 2B is a diagram showing an external constitution of a side surface on the back side of the input device.

FIG. 2B shows an external constitution of a side surface on the back side of the input device 6. On the upper side of the side surface on the back side of the casing of the input device 6, the touch pad 79 is extended from the upper surface of the casing. A horizontally long light emitting portion 85 is provided on the lower side of the side surface on the back side of the casing. The light emitting portion 85 has a red (R) LED, a green (G) LED, and a blue (B) LED (Light Emitting Diode). The light emitting portion 85 illuminates according to light emission color information transmitted from the information processing device 10.

On the side surface on the back side of the casing, an upper side button 83a, a lower side button 84a, an upper side button 83b, and a lower side button 84b are disposed at left and right positions symmetric in a longitudinal direction. The upper side button 83a and the lower side button 84a are operated by the index finger and the middle finger, respectively, of the right hand of the user. The upper side button 83b and the lower side button 84b are operated by the index finger and the middle finger, respectively, of the left hand of the user. As shown in FIG. 2B, the light emitting portion 85 is disposed between the line of the upper side button 83a and the lower side button 84a on the right side and the line of the upper side button 83b and the lower side button 84b on the left side. Therefore the light emitting portion 85 is not hidden by the index fingers or the middle fingers operating the respective buttons. The camera 7 can thus image the illuminating light emitting portion 85 ideally. The upper side button 83 may be configured as a push type button. The lower side button 84 may be configured as a rotatably supported trigger type button.

Figure 3:
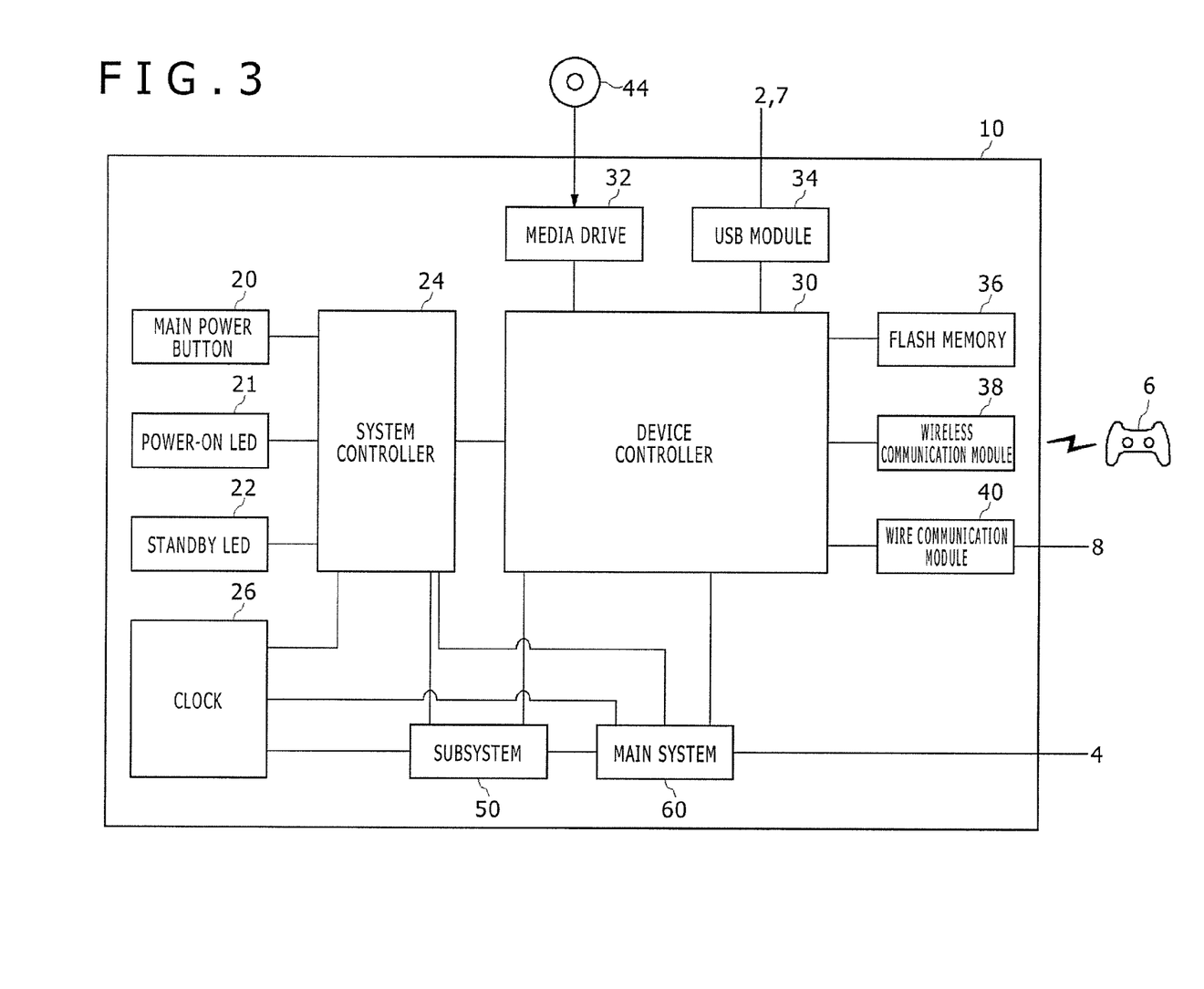
FIG. 3 is a functional block diagram of an information processing device.

FIG. 3 is a functional block diagram of the information processing device 10. The information processing device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be configured as a system on chip, and formed on one chip. The main CPU has a function of executing a game program recorded in the auxiliary storage device 2.

The subsystem 50 includes a sub-CPU, a memory as a main storage device and a memory controller, and the like. The subsystem 50 does not include a GPU, and does not have a function of executing a game program. The number of circuit gates of the sub-CPU is smaller than the number of circuit gates of the main CPU. The power consumption in operation of the sub-CPU is lower than the power consumption in operation of the main CPU. The sub-CPU operates while the main CPU is in a standby state. The processing functions of the sub-CPU are limited to reduce the power consumption of the sub-CPU.

The main power button 20 is an input section to which an operating input from the user is performed. The main power button 20 is provided to a front surface of the casing of the information processing device 10. The main power button 20 is operated to turn on or off the supply of power to the main system 60 of the information processing device 10. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in FIG. 3, the device controller 30 is connected with devices such as the system controller 24, the media drive 32, the USB module 34, the flash memory 36, the wireless communication module 38, the wire communication module 40, the subsystem 50, and the main system 60. The device controller 30 accommodates differences between electrical characteristics of the respective devices and differences between data transfer rates, and controls data transfer timing.

The media drive 32 is a drive device that is loaded with a ROM (Read Only Memory) medium 44 on which application software such as a game and license information are recorded, drives the ROM medium 44, and reads a program, data, and the like from the ROM medium 44. The ROM medium 44 is a read-only recording medium such as an optical disk, a magneto-optical disk, or a Blu-ray disk.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol or an IEEE 802.11 protocol. Incidentally, the wireless communication module 38 may support a third-generation (3rd Generation) digital mobile telephone system compliant with the IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to an external network via the AP 8, for example.

The information processing device 10 according to the present embodiment has a function of measuring a non-operation time during which there is no input from the user, and changing a display screen when the non-operation time reaches a predetermined time. This changing function is implemented by a screen saver. When the non-operation time reaches the predetermined time, the screen saver is started to display a screen saver screen on the output device 4. When there is an input from the user during the display of the screen saver screen, the operation of the screen saver is ended, and an original screen or another screen is displayed on the output device 4 in place of the screen saver screen.

Figure 4:
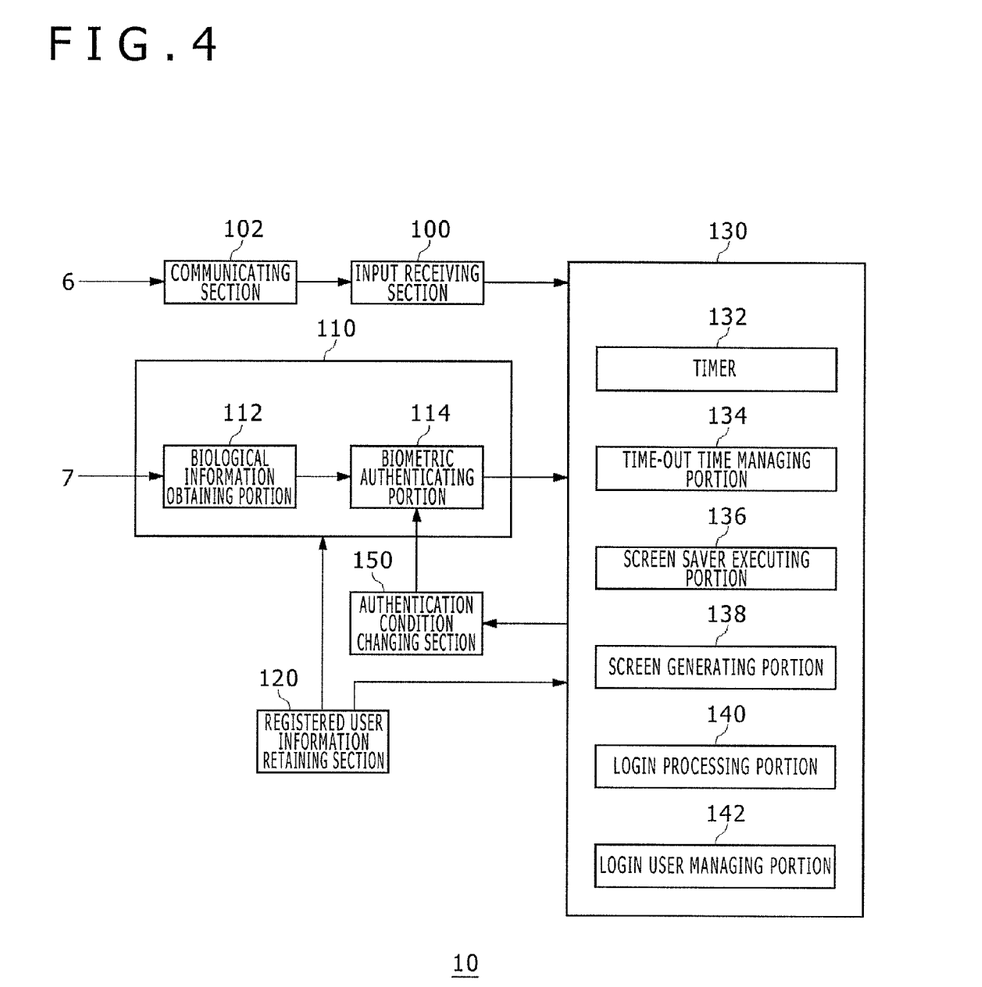
FIG. 4 is a diagram showing a constitution of the information processing device having a display screen changing function.

FIG. 4 shows a configuration of the information processing device 10 having the display screen changing function. The information processing device 10 includes an input receiving section 100, a communicating section 102, a user authenticating section 110, a registered user information retaining section 120, a display control section 130, and an authentication condition changing section 150. The user authenticating section 110 includes a biological information obtaining portion 112 and a biometric authenticating portion 114. The user authenticating section 110 has a function of performing user authentication using biological information. The communicating section 102 represents functions of the radio communication module 38 and the wire communication module 40 shown in FIG. 3.

The elements described as functional blocks performing various processing in FIG. 4 can be configured by a circuit block, a memory, and another LSI in terms of hardware, and is implemented by a program loaded in a memory or the like in terms of software. Hence, it is to be understood by those skilled in the art that these functional blocks can be implemented in various forms by only hardware, only software, or combinations of hardware and software, and are not limited to any one of the forms.

The input receiving section 100 receives inputs from the input device 6. The inputs include button operations by the user, and also include a detected value of an acceleration sensor incorporated in the input device 6. Incidentally, in a case where the input device 6 periodically transmits the detected value of the sensor to the information processing device 10, when there is a change in the detected value of the sensor, the input receiving section 100 receives the detected value of the sensor as an input. However, when there is no change in the detected value of the sensor, the input receiving section 100 does not receive the detected value of the sensor as an input. That is, the input receiving section 100 has a function of receiving a significant input from the input device 6.

When the input receiving section 100 has not received any input for a predetermined time, the display control section 130 changes the display screen of the output device 4 to a predetermined screen (hereinafter referred to also as a "first screen"). The time during which the input receiving section 100 does not receive any input will hereinafter be referred to as a "non-operation time." When the non-operation time has reached a predetermined time, the display control section 130 in the present embodiment starts the screen saver, and displays a first screen (screen saver screen) generated by the screen saver on the output device 4.

The display control section 130 includes a timer 132, a time-out time managing portion 134, a screen saver executing portion 136, a screen generating portion 138, a login processing portion 140, and a login user managing portion 142. The display control section 130 has a function of changing the display screen displayed on the output device 4. Incidentally, the display control section 130 in the present embodiment has a login processing function for logging in the user. However, the login processing function may be configured as a functional block separated from the display control section 130.

The timer 132 measures a time from the reception of an input by the input receiving section 100 to the reception of a next input. The time-out time managing portion 134 manages a time for starting the screen saver. Specifically, the time-out time managing portion 134 retains a time (T1) for starting the screen saver. The time T1 may be set by the user. For example, the user registers the time T1 in advance by selecting one from a plurality of options (five minutes, 15 minutes, and 30 minutes).

Description will be made of processing in which a login screen for logging the user in to the information processing device 10 is displayed and the displayed login screen is changed to a screen saver screen. As a precondition for logging in to the OS of the information processing device 10, the user needs to obtain a user account in advance, and register various user information in the information processing device 10. The user who has registered the user account in the information processing device 10 will hereinafter be referred to as a "registered user."

The registered user information retaining section 120 retains various information related to a plurality of registered users in the information processing device 10. Specifically, the registered user information retaining section 120 retains, as registered user information in association with a user account, a login passcode, a sign-in ID (Identification) for signing in to an external server, a network account, a user online ID, a user icon for representing the user, and the like. Incidentally, as for a registered user who has registered a face image in advance for face authentication processing, the registered user information retaining section 120 retains face identifying data as registered user information in association with the user account.

In this case, the face identifying data is feature quantity data of the face image of the registered user. However, the face identifying data may be the face image data itself. The face identifying data is used as an object of comparison in face recognition processing by the biometric authenticating portion 114, and is generated according to a face recognition algorithm adopted by the biometric authenticating portion 114. For example, the face identifying data may be data extracted, as features, the relative position and size of parts of the face and the shapes of eyes, a nose, a cheekbone, and a chin. In addition, the face identifying data may be data extracted as difference data from the standard data of a face image. What kind of face identifying data to extract is determined by the face recognition algorithm adopted by the biometric authenticating portion 114.

When the user before logging in depresses the function button 80 of the input device 6, power to the input device 6 is turned on, and a connection request is transmitted to the information processing device 10. In the information processing device 10, the communicating section 102 receives the connection request, and connects the input device 6 and the communicating section 102 to each other. The connection request made by the depression of the function button 80 is transmitted to the input receiving section 100 as a login request. The input receiving section 100 passes the login request to the display control section 130. Incidentally, the login request may be generated automatically and transmitted from the input device 6 to the information processing device 10 after the connection of the information processing device 10 to the input device 6.

In the display control section 130, the login processing portion 140 gives the screen generating portion 138 an instruction to generate a login screen. The screen generating portion 138 reads registered user information retained in the registered user information retaining section 120, and generates a selecting screen for selecting a user registered in the information processing device 10. Specifically, the screen generating portion 138 reads user icons and online IDs (or nicknames on a network) in the registered user information, and displays a user selecting screen on which the online IDs of registered users are arranged in a list format on the output device 4.

Figure 5A:
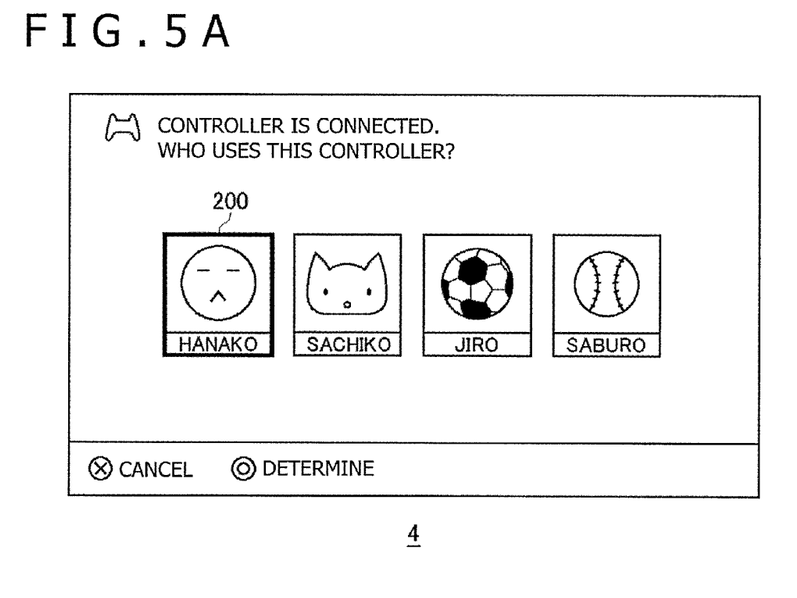
FIG. 5A is a diagram showing an example of a user selecting screen.

FIG. 5A shows an example of the user selecting screen. The screen generating portion 138 reads the user icons and online IDs of all of registered users which user icons and online IDs are retained in the registered user information retaining section 120, and displays the read user icons and the read online IDs in a list format in such a manner as to be selectable by a user. The user icons and the online IDs will hereinafter be referred to as "user identifying information." Incidentally, the user identifying information is not limited to the user icons and the online IDs, but may be information for identifying the users, for example photographs, user names, nicknames, or the like of the users.

On the user selecting screen, the screen generating portion 138 displays a focus frame 200 surrounding one piece of user identifying information in such a manner as to be movable on a list. The user can select the user identifying information of the user by moving the focus frame 200 to a display region of the user identifying information of the user by operating the input portions of the input device 6, and pressing the determination button (circle button 72) of the input device 6.

Figure 5B:
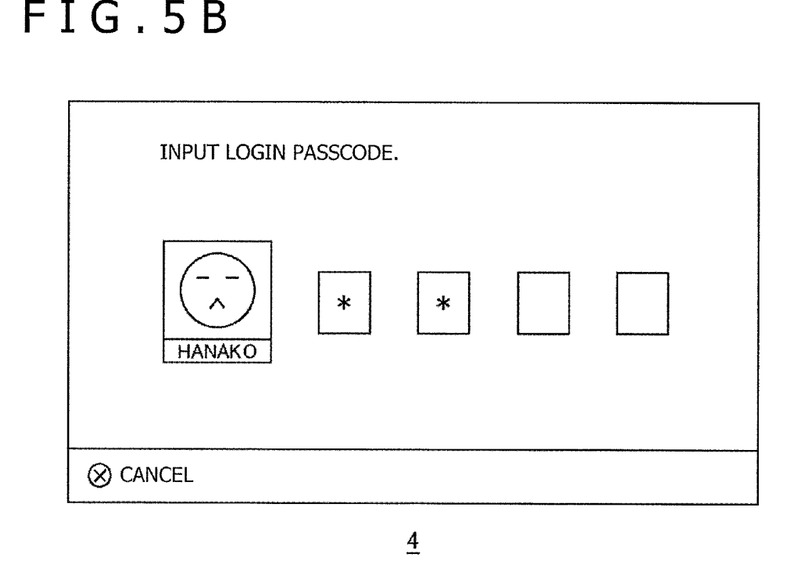
FIG. 5B is a diagram showing an example of a password input screen.

Suppose in this case that the user requesting a login is user A. When user A selects "HANAKO" on the selecting screen by operating the input device 6*a* and presses the determination button, the screen generating portion 138 displays a passcode input screen shown in FIG. 5B on the output device 4. In this case, when user A inputs a registered passcode, the login processing portion 140 determines whether the input passcode is the same as the login passcode of HANAKO which login passcode is retained in the registered user information retaining section 120. When the input passcode is the same as the login passcode of HANAKO which login passcode is retained in the registered user information retaining section 120, the login processing portion 140 allows user A (HANAKO) to log in. The login processing portion 140 stores login information, that is, information identifying user A (HANAKO) (user account) and information identifying the input device 6*a* (device ID) in a state of being associated with each other, in the login user managing portion 142. Incidentally, the information processing device 10 according to the present embodiment allows a plurality of users to log in simultaneously. Thus, after user A logs in, user B can also log in to the information processing device 10 by operating the input device 6*b*.

User A logs in to the information processing device 10 by thus selecting the user identifying information on the user selecting screen. After logging in, user A can operate the system software of the information processing device 10 or an application. Incidentally, in the background of the login screen shown in FIG. 5A, a user authenticating function by the user authenticating section 110 is also performed. During the display of the user selecting screen, the user authenticating section 110 is searching the image imaged by the camera 7 for a face image as a registered image. When the face image of a registered user is included in the imaged image, the login processing portion 140 may give the screen generating portion 138 an instruction to generate a login screen for face authentication. The face authentication login will be described later. In either case, the user selecting screen for a user to select user identifying information by operating the input device 6 and the face authentication login screen for performing face authentication are prepared as login screens in the information processing device 10 according to the present embodiment.

The user can log in desirably in the above case. However, on the other hand, there is a case where the user does not operate the input device 6 on the login screen shown in FIG. 5A, face detection by the user authenticating section 110 is not performed successfully either, and the login screen is left as it is in a state of being displayed on the output device 4. When the input receiving section 100 receives a login request, the input receiving section 100 notifies the login request to the display control section 130, so that the screen generating portion 138 displays the login screen. At this time, the timer 132 starts to measure a time from a time point of reception of a last input, that is, the login request, to a next input, that is, a time during which there is no input (non-operation time). The timer 132 has a function of resetting a counter and starting to measure a non-operation time again when the input receiving section 100 receives an input.

The time-out time managing portion 134 retains a time for starting the screen saver as a time-out time T1. When the timer 132 detects that the non-operation time has reached the time-out time T1, the timer 132 notifies the screen saver executing portion 136 to that effect. The screen saver executing portion 136 consequently starts the screen saver, and changes the login screen that has been displayed to a first screen (screen saver screen). The screen saver may generate a black screen by darkening the login screen. In addition, the screen saver may display another screen, for example the logotype of the game device rather than the simply darkened screen.

Description will be made of a method of canceling the screen saver.

When the input receiving section 100 receives an input from the input device 6, the timer 132 and the screen saver executing portion 136 are notified that an input has been received. The counter of the timer 132 is reset, and the screen saver executing portion 136 ends the operation of the screen saver. The screen saver executing portion 136 notifies the cancellation of the screen saver to the screen generating portion 138. The screen generating portion 138 consequently changes the screen saver screen to the original login screen shown in FIG. 5A. This allows the user to perform a login operation. Inputs from the input device 6 include button operations by the user, and also include the detected value of the acceleration sensor. Hence, when the user operates or moves the input device 6, the input receiving section 100 receives the input, so that the operation of the screen saver is ended. This canceling method will be referred to as a canceling method based on operating input.

The following description will be made of a canceling method based on biometric authentication according to the present embodiment which canceling method is used in combination with the canceling method based on operating input.

As already described, the user authenticating function by the user authenticating section 110 is started in login processing. Hence, the user authenticating function based on face authentication is performed while the screen saver screen is displayed.

The user authenticating section 110 includes: the biological information obtaining portion 112 configured to obtain biological information; and the biometric authenticating portion 114 configured to determine whether or not a user whose biological information is obtained is a registered user by comparing the biological information obtained by the biological information obtaining portion 112 with biological information retained in the registered user information retaining section 120. Specifically, the biological information obtaining portion 112 receives an imaged image from the camera 7 in predetermined cycles P1, extracts a part assumed to be the face of a person in the imaged image, and informs the biometric authenticating portion 114 of position coordinates in the extracted part in the imaged image. Incidentally, the biological information obtaining portion 112 may obtain the imaged image, and transfer the obtained imaged image to the biometric authenticating portion 114 as it is.

The biometric authenticating portion 114 derives the feature quantity data of the extracted part, and compares the feature quantity data of the extracted part with a plurality of pieces of face identifying data retained in the registered user information retaining section 120 to determine whether or not the extracted face is the face of a registered user.

Specifically, the biometric authenticating portion 114 derives degrees of coincidence between the feature quantity data of the extracted face image of the user and the face identifying data of all of registered users which face identifying data is retained in the registered user information retaining section 120. This degree of coincidence is expressed numerically. The degree of coincidence is derived as a score on a scale of 100, for example. When a degree of coincidence with the feature quantity data of a registered face image exceeds a score of 90, the biometric authenticating portion 114 determines that the imaged user is a registered user, and identifies which registered user the imaged user is. Incidentally, when there are a plurality of degrees of coincidence that exceed the score of 90, it suffices for the biometric authenticating portion 114 to determine that the imaged user is the registered user of face identifying data from which a highest score is derived. Incidentally, when there is no degree of coincidence that exceeds the score of 90 as a result of deriving degrees of coincidence between the feature quantity data of the face image of the user which face image is extracted from the imaged image and the face identifying data of all of the registered users, the biometric authenticating portion 114 determines that the user included in the imaged image is not a registered user. The biometric authenticating portion 114 thus detects the face image of the registered user included in the imaged image using the face identifying data retained in the registered user information retaining section 120. A known technology may be used as this face identifying technology.

When the biometric authenticating portion 114 determines that the face image of a registered user is included in the imaged image, the timer 132 and the screen saver executing portion 136 are notified to that effect. In response to this notification, the counter of the timer 132 is reset, and the screen saver executing portion 136 ends the operation of the screen saver. In addition, the screen saver executing portion 136 notifies the cancellation of the screen saver to the screen generating portion 138. The screen generating portion 138 consequently changes the screen saver screen to another screen (second screen). At this time, although the screen generating portion 138 may change to the original login screen shown in FIG. 5A, the screen generating portion 138 may generate a login screen for face authentication which login screen is shown in FIG. 6 when it is detected by face authentication that the face image of a registered user is photographed.

Figure 6:
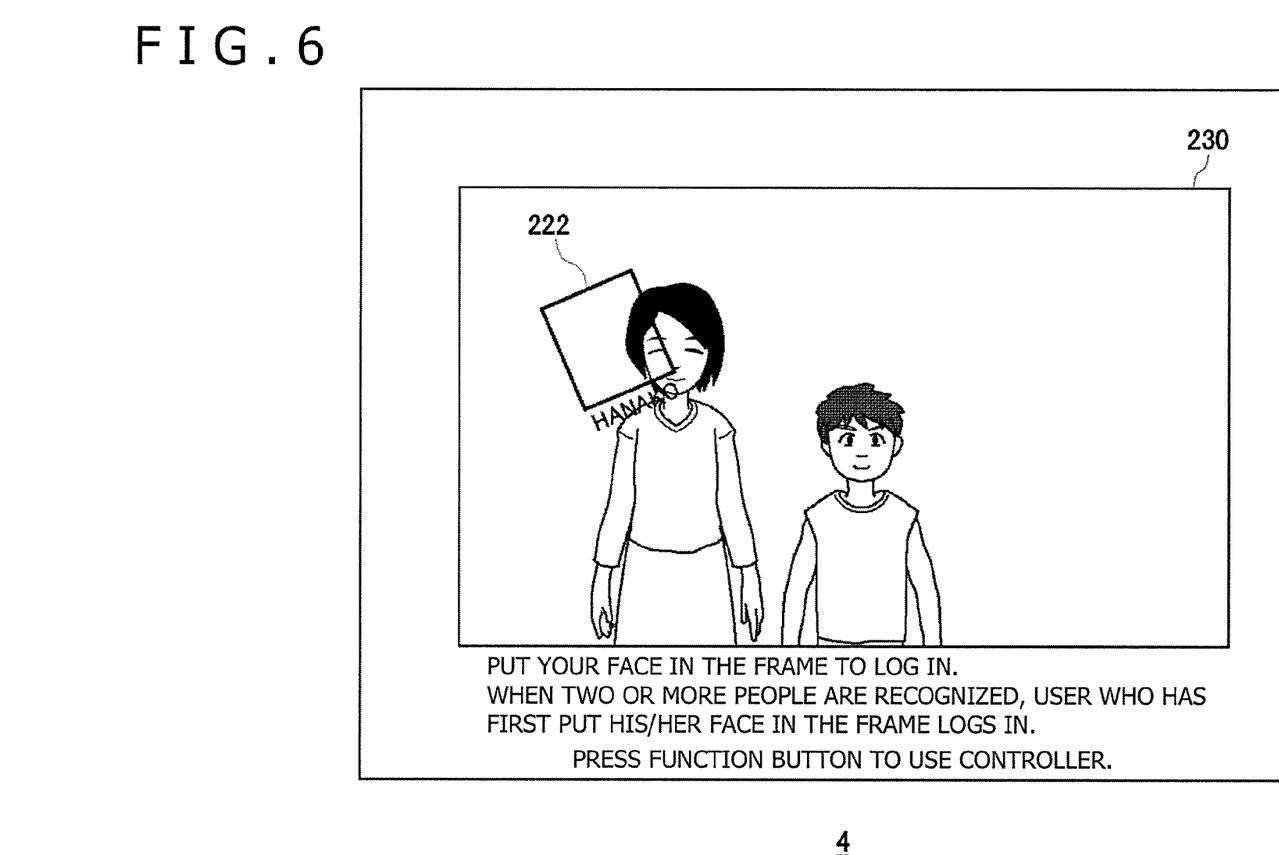
FIG. 6 is a diagram showing a face authentication login screen.

FIG. 6 shows the face authentication login screen displayed on the output device 4. On the face authentication login screen, the screen generating portion 138 makes live display of the image imaged by the camera 7, which image is obtained by the biological information obtaining portion 112, in an imaged image display region 230.

The login processing portion 140 displays a face frame 222 in the vicinity of the face of the registered user in the imaged image display region 230. In this case, the face frame 222 is displayed for user A, and the online ID (or the nickname or the like) of user A is displayed in the vicinity of the face frame 222. Incidentally, no face frame is displayed for a user who is not a registered user.

Figure 7:
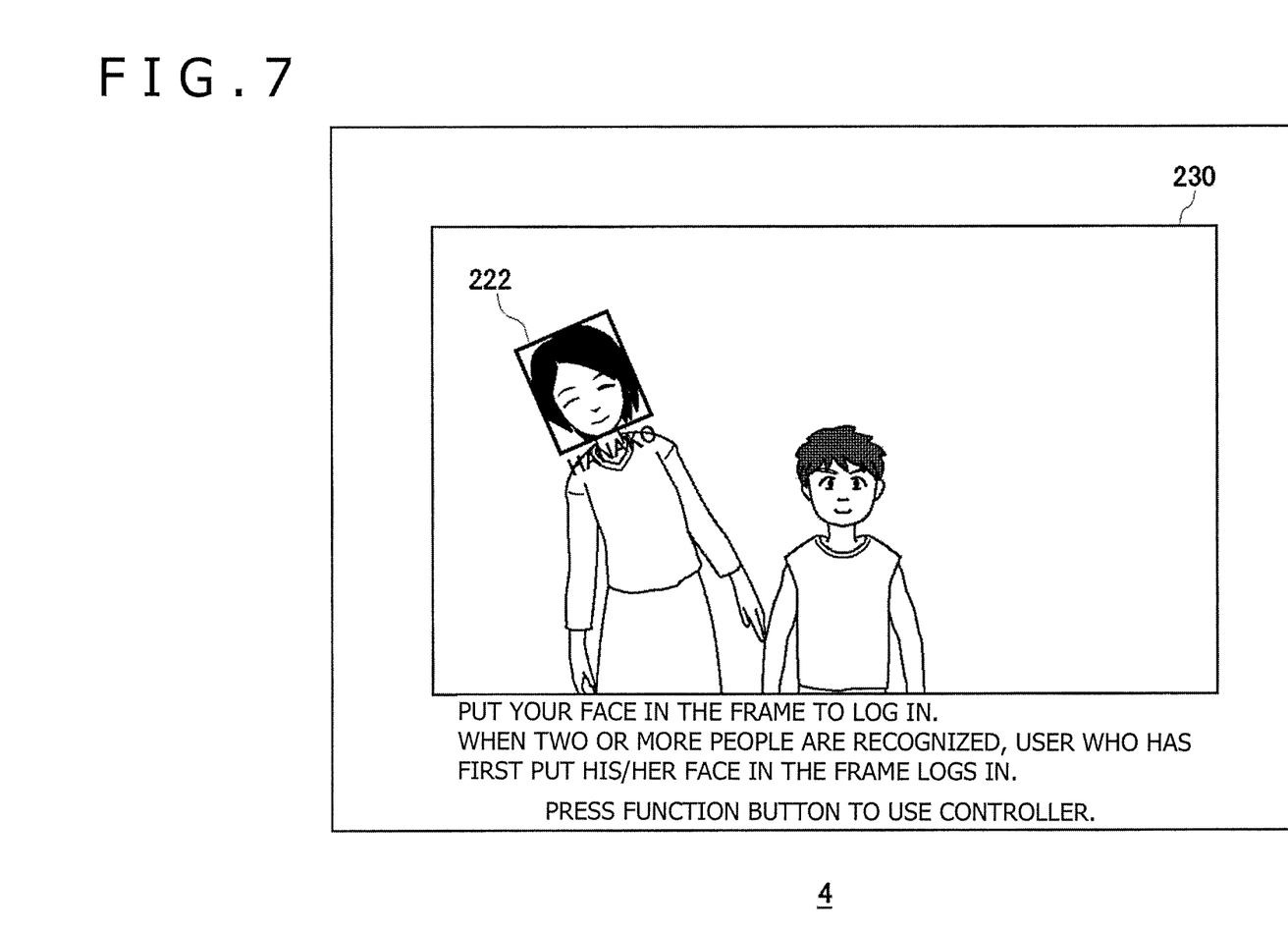
FIG. 7 is a diagram showing the login screen on which a user puts his or her face in a face frame.

FIG. 7 shows a login screen on which the user puts his or her face in the face frame. In this case, user A is shown moving his or her face and body so that his or her face is in the face frame 222. The biometric authenticating portion 114 monitors whether the face of a person is in the face frame 222. When the face of a person is in the face frame 222, the biometric authenticating portion 114 determines whether the face within the face frame 222 is the face of a registered user, using the face identifying data retained in the registered user information retaining section 120. When the biometric authenticating portion 114 determines that the face in the face frame 222 is the face of user A, the login processing portion 140 logs user A in to the information processing device 10. The login processing portion 140 stores login information, that is, information identifying user A (user account) in the login user managing portion 142. Thus, when the presence of a registered user is detected by biometric authentication after the login screen shown in FIG. 5A is changed to the screen saver screen, the login screen for biometric authentication which login screen is shown in FIG. 6 is displayed to allow the user to perform a login operation.

When the operation of the screen saver is thus ended on condition that a registered user is imaged by the camera 7, the login screen is displayed without the user operating the input device 6. Further, when the login screen for face authentication is displayed, the user can easily log in to the information processing device 10 without operating the input device 6.

Incidentally, while description has been made of a case where the biological information obtaining portion 112 receives the imaged image from the camera 7 in predetermined cycles P1, the biometric authenticating portion 114 may perform face authentication processing in cycles P2 longer than the cycles P1 during the display of the screen saver screen. That is, the biometric authenticating portion 114 may perform face authentication processing while thinning out the imaged images received by the biological information obtaining portion 112. The user authentication performed during the display of the screen saver screen is performed to determine whether or not to cancel the screen saver. Therefore, the user authentication performed during the display of the screen saver screen is not of high importance as compared with the user authentication performed during the display of the face authentication login screen shown in FIG. 6 and FIG. 7. This is because the option of the canceling method based on operating input is prepared as a method of canceling the screen saver in addition to the canceling method based on biometric authentication, and thus the user can cancel the screen saver by operating the input device 6 even if the canceling method based on biometric authentication does not function. On the other hand, on the login screen for face authentication, user authentication for determining whether or not to log in the user is performed, and is therefore of high importance. Accordingly, the biometric authenticating portion 114 performs face authentication processing in cycles P1 during the display of the face authentication login screen. Thus, even when the biometric authenticating portion 114 performs the same face authentication processing, it is desirable that the cycles of face detection during the display of the screen saver screen be made longer than the cycles of face detection during the display of the login screen, that is, the number of times of face detection processing per unit time be decreased to reduce the load of the face authentication processing during the display of the screen saver screen.

The authentication condition changing section 150 gives the biometric authenticating portion 114 an instruction to perform face authentication processing in cycles P2 during the operation of the screen saver. On the other hand, the authentication condition changing section 150 gives the biometric authenticating portion 114 an instruction to perform face authentication processing in cycles P1 during login processing. When the authentication condition changing section 150 thus sets an authentication condition according to whether or not the screen saver is operating, the processing load on the biometric authenticating portion 114 can be adjusted.

In addition, description has been made of a case where the biometric authenticating portion 114 derives a degree of coincidence between the feature quantity data of a face image included in an imaged image and face identifying data retained in the registered user information retaining section 120, and when the degree of coincidence exceeds a predetermined threshold value (for example score of 90), the biometric authenticating portion 114 determines that the imaged user is a registered user. This threshold value may be set so as to be different according to whether face authentication processing during the display of the login screen is performed or whether face authentication processing during the display of the screen saver screen is performed. Face authentication processing during the display of the login screen is processing for identifying a login user, and is thus desired to be highly accurate, whereas face authentication processing during the display of the screen saver screen is not desired to be as highly accurate. From such a viewpoint, the authentication condition changing section 150 gives the biometric authenticating portion 114 an instruction to perform face authentication processing using a threshold value M1 during the display of the screen saver screen, whereas the authentication condition changing section 150 gives the biometric authenticating portion 114 an instruction to perform face authentication processing using a threshold value M2 (>M1) during the display of the login screen. For example, M1 may be set at a score of 90, and M2 may be set at a score of 95. When the threshold value is thus set, the screen saver is canceled relatively easily.

In addition, description has been made of a case where the time-out time managing portion 134 manages the time-out time T1. The time-out time T1 may be changed as appropriate. When the screen saver is canceled on the basis of face authentication, the user may have intended to cancel the screen saver and thus faced the camera 7, but the user not intending to log in may only have happened to pass in front of the camera 7 and thus have been photographed. That is, the screen saver may be cancelled on the basis of face authentication irrespective of whether or not the user intends to cancel the screen saver. In the former case, when the screen generating portion 138 displays the face authentication login screen after the cancellation of the screen saver, the user will put the face in the face frame 222. In the latter case, the user does not intend to log in, so that the user does not put the face in the face frame 222.

The timer 132 starts to measure the non-operation time immediately after the face authentication login screen is displayed. When the user does not intend to log in, the output device 4 continues to display the image imaged by the camera 7 until the screen saver is started after the passage of the time-out time T1. Accordingly, in order to avoid such a state, after the screen saver is canceled on the basis of face authentication, the time-out time managing portion 134 sets the time-out time to T2, which is shorter than T1. For example, when T1 is 15 minutes, T2 may be one minute. Consequently, when the timer 132 detects that the non-operation time has reached the time-out time T2, the screen saver executing portion 136 immediately starts the screen saver, so that the screen saver screen is displayed.

The above description has been made of a method of canceling the screen saver started during the display of the login screen. Also during the display of a system screen or an application screen other than the login screen, the screen saver is started when the non-operation time has reached the time-out time T1. Incidentally, the system screen refers to a display screen generated by the system software, and the application screen refers to a display screen generated by application software.

Figure 8:
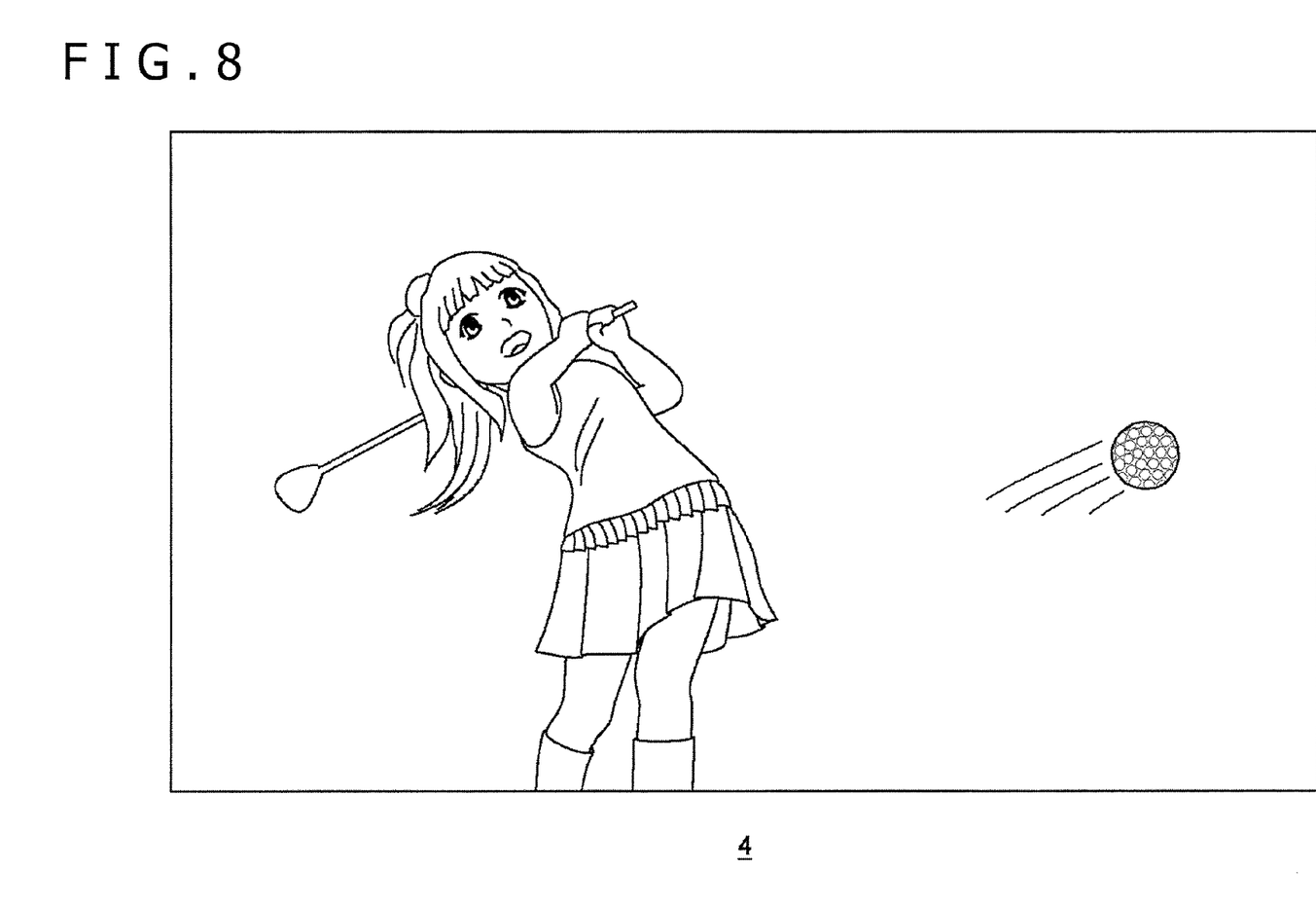
FIG. 8 is a diagram showing an example of a game screen.

FIG. 8 shows an example of the game screen of a game played by a login user. In the present example, the login user is playing a golf game. The login user managing portion 142 manages the login user, and stores information identifying the login user (user account) and information identifying the input device 6 used by the login user (device ID) in association with each other. The OS of the information processing device 10 can thereby determine which user has input operation information of the input device 6. When a message directed to the login user arrives from another online user during the game play, for example, the login user managing portion 142 displays a notification notifying the reception of the message in a state of being superimposed on the game screen.

When the timer 132 measures the non-operation time, and detects that the non-operation time has reached the time-out time T1, the timer 132 notifies the screen saver executing portion 136 to that effect. Consequently, the screen saver executing portion 136 starts the screen saver, and changes the game screen that has been displayed to a first screen (screen saver screen). The screen saver may generate a black screen by darkening the login screen. Alternatively, the screen saver may display another screen, for example the logotype of the game device rather than the simply darkened screen.

During the display of the screen saver screen, the screen saver executing portion 136 ends the operation of the screen saver on the basis of operating input or biometric authentication as described above. At this time, the login user managing portion 142 can identify the user who canceled the screen saver. When the input device 6 is operated, the user tied to the input device 6 can be identified. When the biometric authenticating portion 114 performs face authentication, the user can be identified, of course. The login user managing portion 142 determines whether or not a new message to the user has arrived during the period of display of the screen saver screen. When a new message has arrived, the login user managing portion 142 may make the screen generating portion 138 generate a newly arrived message notification screen. When no new message has arrived, the login user managing portion 142 may make the screen generating portion 138 generate a menu screen for the user. The notification screen and the menu screen are system screens generated by the system software.

Figure 9:
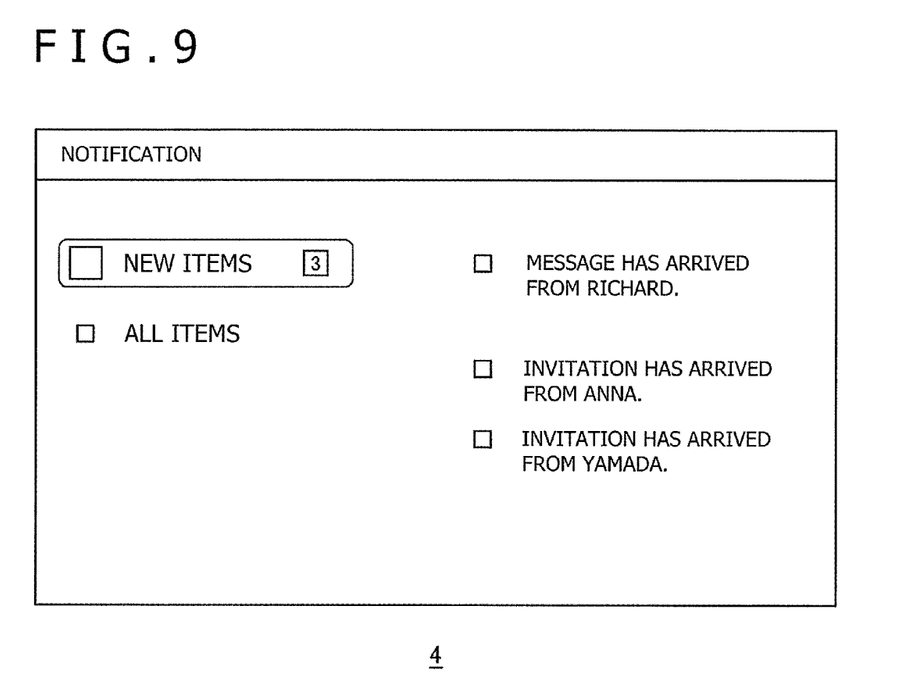
FIG. 9 is a diagram showing a notification screen that presents newly arrived messages to a login user.

FIG. 9 shows a notification screen that presents newly arrived messages to a user who canceled the screen saver. During the display of the screen saver screen, the user does not know that messages to the user himself or herself have arrived. Thus, displaying the notification screen on the output device 4 together with the cancellation of the screen saver enables the user to immediately view the messages or the like that have arrived during the display of the screen saver screen.

Figure 10:
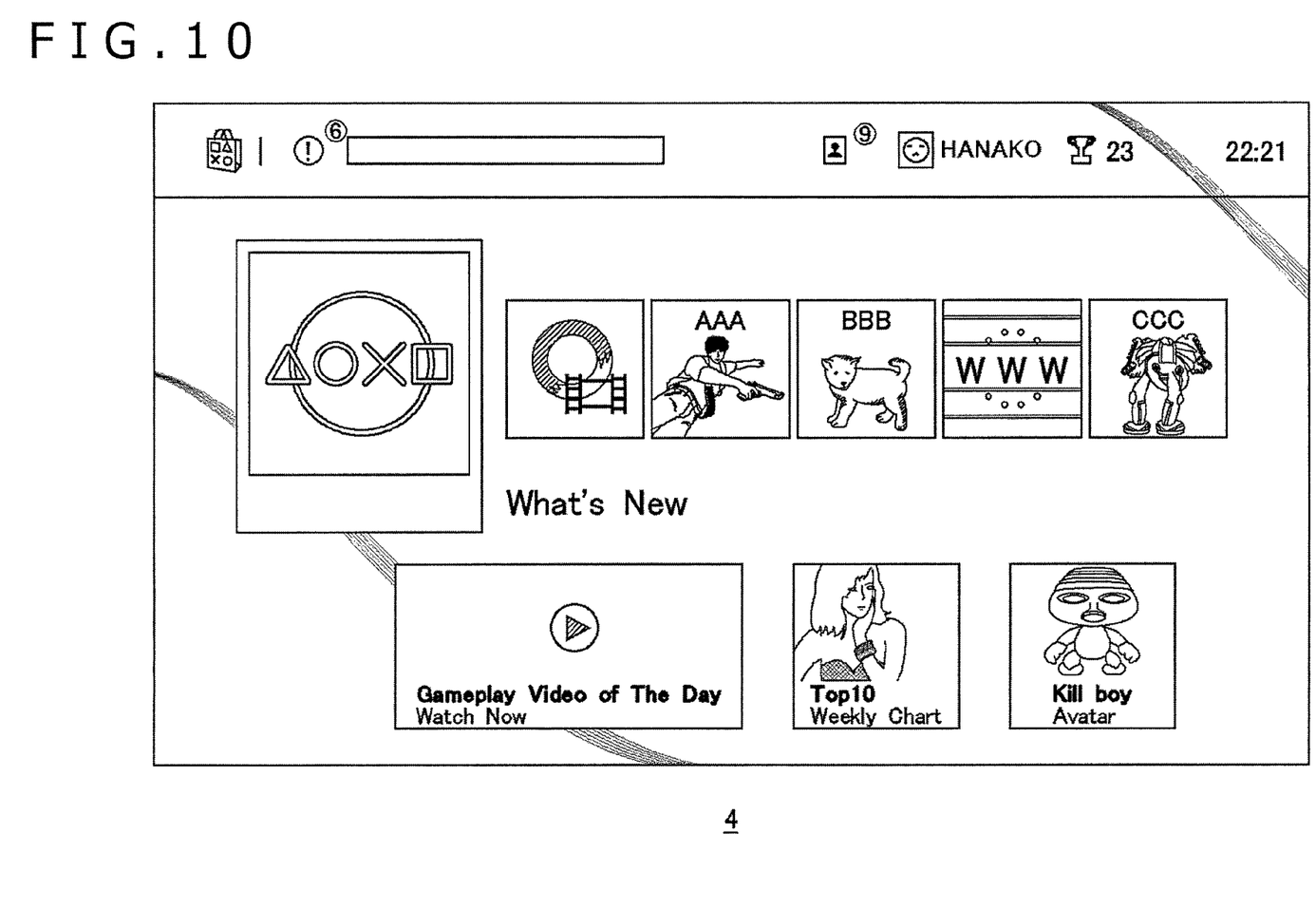
FIG. 10 is a diagram showing a menu screen for a login user.

FIG. 10 shows a menu screen for a user who canceled the screen saver. When there is no newly arrived message, the screen generating portion 138 may display the menu screen for the user on the output device 4. The screen generating portion 138 thus generates, as a second screen, the display screen for the login user who canceled the screen saver. The login user can view the screen dedicated to the user. Incidentally, the screen generating portion 138 may display the game screen shown in FIG. 8 again.

The present disclosure has been described above on the basis of an embodiment thereof. The present embodiment is illustrative, and it is to be understood by those skilled in the art that combinations of constituent elements and processing processes of the embodiment are susceptible of various modifications and that such modifications also fall within the scope of the present disclosure. For example, when the screen saver is canceled on the basis of biometric authentication, a message to the effect that the screen saver is canceled on the basis of biometric authentication may be displayed. In addition, in the embodiment, description has been made of a case where the screen saver changes the display screen to a first screen (screen saver screen) when the non-operation time has reached the time-out time. However, when the non-operation time has reached the time-out time, the display control section 130 may turn off a display power supply of the output device 4 and change the display screen to a first screen as a non-output screen using a utility that turns off the display power supply rather than the screen saver.

In the embodiment, an example has been shown in which the user authenticating section 110 performs user authentication on the basis of face detection. However, user authentication may be performed by voice authentication. In this case, the registered user information retaining section 120 registers voice models obtained by analyzing the voices of registered users and extracting characteristic data. The biological information obtaining portion 112 obtains the voice of a user through a microphone. The biometric authenticating portion 114 determines whether or not the voice of the user is the voice of a registered user by checking characteristic data extracted from the obtained voice against the voice models registered in the registered user information retaining section 120. The biometric authenticating portion 114 can thus identify a registered user by voiceprint authentication. Thus, the screen saver can be canceled ideally, and also the screen generating portion 138 can be made to generate a screen dedicated to the user after the cancellation.

The present disclosure contains subject matter related to that disclosed in Japanese Priority Patent Application JP 2014-081029 filed in the Japan Patent Office on Apr. 10, 2014, the entire content of which is hereby incorporated by reference.

What is claimed is:

1. An information processing device having a processor, the information processing device comprising:
   an input receiving section receiving an input from a user using an input device, the input device in communication with the information processing device;
   a display control section changing a display screen, using the processor, to a screen saver when the input receiving section has not received any input for a predetermined time;
   a registered user information retaining section retaining biological information of a plurality of users registered in the information processing device;
   a biological information obtaining portion monitoring images captured by an imaging device and obtaining biological information from images captured periodically,
   wherein the biological information obtaining portion monitors images at a first rate when the screen saver is displayed; and
   a biometric authenticating portion determining, when biological information is obtained during display of the screen saver, whether a user whose biological information is obtained by the biological information obtaining portion is a registered user by comparing the obtained biological information with the biological information of the plurality of users retained in the registered user information retaining section, wherein when the biometric authenticating portion determines that the user whose biological information is obtained is a registered user, the display control section changes the screen saver to a login screen wherein the biological information obtaining portion monitors images at a second rate when the login screen is displayed, with the second rate greater than the first rate, wherein, when the input receiving section has not received any input for the predetermined time while the display control section is displaying a system screen or an application screen for a logged-in user, the display control section displays the screen saver, and when the biometric authenticating portion determines that the biological information obtained by the biological information obtaining portion is biological information of the logged-in user during the display of the screen saver by the display control section, the display control section displays the system screen or the application screen.

2. The information processing device according to claim 1, wherein login screen is a face authentication login screen.

3. The information processing device according to claim 1, while the screen saver is displayed, the biometric authenticating portion compares the obtained biological information with the biological information of the plurality of users and determines a matching score for each comparison, and determines that the user whose biological information is obtained is a registered user if the match score for the user is greater than a first predetermined threshold.

4. The information processing device according to claim 3, while the login screen is displayed, the biometric authenticating portion compares obtained biological information with the biological information of the plurality of users and determines a matching score for each comparison, and determines that the user whose biological information is obtained is a registered user if the match score for the user is greater than a second predetermined threshold, wherein the second predetermined threshold is greater than the first predetermined threshold.

5. A non-transitory computer readable recording medium on which a program for a computer is recorded, the program including:

receiving an input from a user;

changing a display screen to a screen saver when no input has been received for a predetermined time;

monitoring images captured by an imaging device, wherein images are captured at a first rate when the screen saver is displayed;

obtaining biological information from images captured periodically;

determining, when the screen server is displayed, whether a user whose biological information is obtained is a registered user by comparing the obtained biological information with biological information of a plurality of users registered in the computer; and changing the screen saver to a login screen when it is determined that the user whose biological information is obtained is a registered user, wherein images are captured at a second rate when the login screen is displayed wherein, when no input has been for the predetermined time while a system screen or an application screen for a logged-in user is displayed, the screen saver is displayed, and when it is determined that the biological information is biological information of the logged-in user during the display of the screen saver, the system screen or the application screen is displayed.

* * * * *